United States Patent [19]

Shaw

[11] Patent Number: 5,438,762

[45] Date of Patent: Aug. 8, 1995

[54] MEANS TO ESTABLISH AND MAINTAIN AN ENGAGEMENT CHORD FOR PLIABLE AND INFLATABLE MEMBERS IN A DESIRED PLANE IN A MEASURING APPARATUS

[76] Inventor: Howard C. Shaw, 700 Wyndwicke Dr., St. Joseph, Mich. 49085

[21] Appl. No.: 195,319

[22] Filed: Feb. 14, 1994

[51] Int. Cl.⁶ .................................................. G01B 5/04
[52] U.S. Cl. ........................................... 33/734; 33/747
[58] Field of Search ................. 33/734, 732, 733, 735, 33/743, 747, 748, 752, 754

[56] References Cited

U.S. PATENT DOCUMENTS

| | | | |
|---|---|---|---|
| 635,779 | 10/1899 | Hunt et al. ............................. | 33/734 |
| 2,197,196 | 4/1940 | Schlup .................................. | 33/732 |
| 2,716,818 | 9/1955 | Fitler .................................... | 33/732 |
| 5,065,527 | 11/1991 | Shaw .................................... | 33/734 |
| 5,267,401 | 12/1993 | Freeman et al. ...................... | 33/733 |

*Primary Examiner*—Christopher W. Fulton
*Attorney, Agent, or Firm*—Leo H. McCormick, Jr.

[57] ABSTRACT

A measuring device having a mounting arrangement for adjusting the space relationship between first and second shafts in a housing to maintain an engagement chord created between first and second inflatable and pliable members in the plane of the path of a product and an inflator system to maintain a constant fluid pressure in the first and second inflatable and pliable members to sustain a desired circumference for the first and second inflatable and pliable members once calibration has been established for the measuring device.

10 Claims, 3 Drawing Sheets

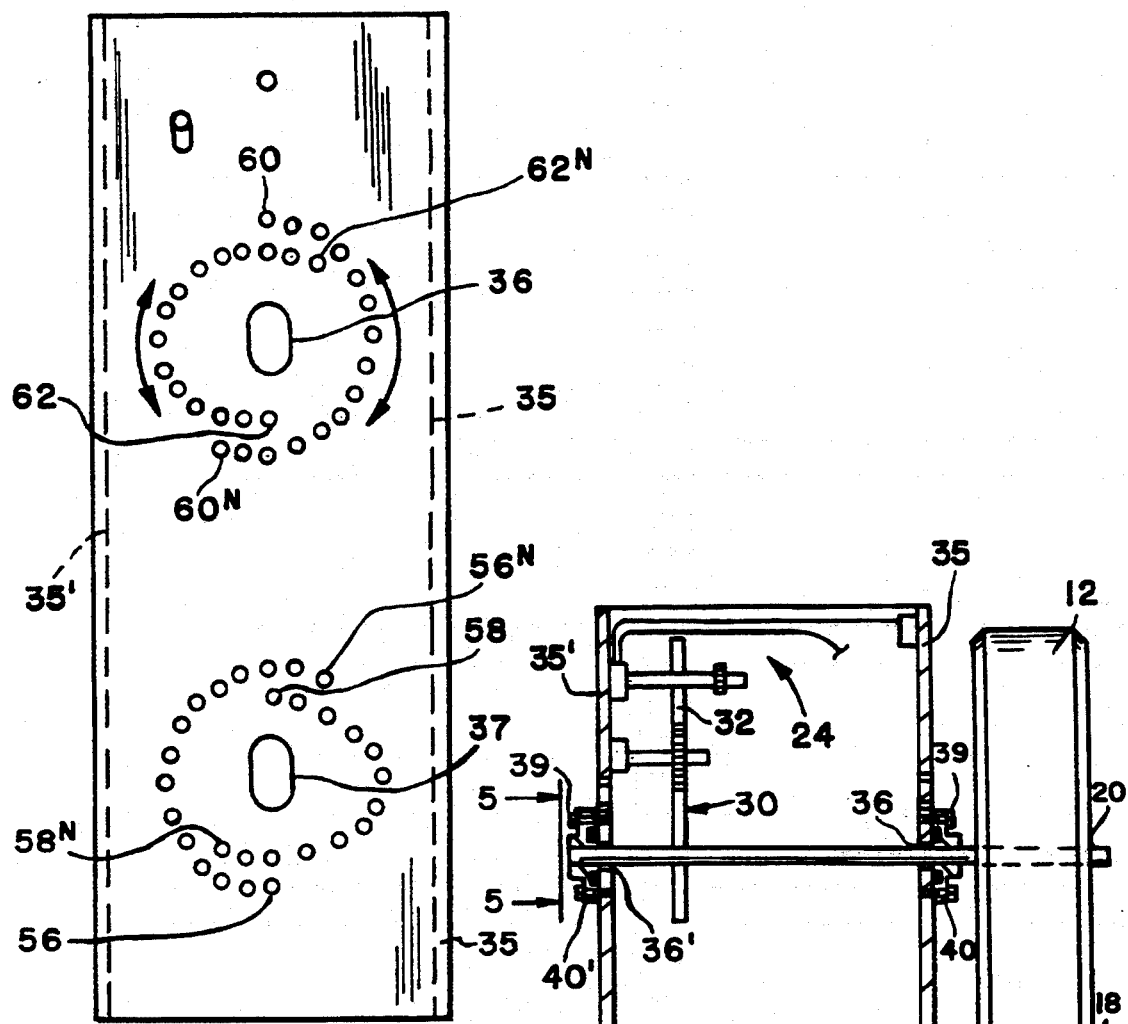
FIG. 3
FIG. 2
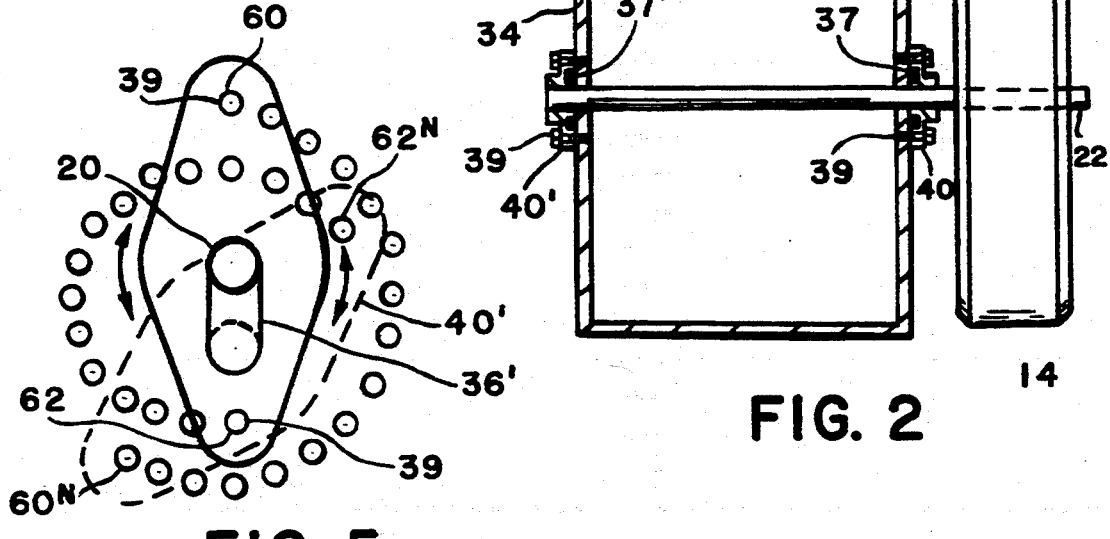
FIG. 5

MEANS TO ESTABLISH AND MAINTAIN AN ENGAGEMENT CHORD FOR PLIABLE AND INFLATABLE MEMBERS IN A DESIRED PLANE IN A MEASURING APPARATUS

This invention relates to means for adjusting the position of a first shaft with respect to a second shaft to establish a desired chord length of engagement between first and second inflatable and pliable members retained on the first and second shafts of a measuring device and for sustaining the chord length after an extended period of use of the measuring device by maintaining a desired fluid pressure in the first and second inflatable and pliable members.

BACKGROUND OF THE INVENTION

U.S. Pat. No. 5,065,527 discloses a positive drive length measuring apparatus for accurately measuring the length of a continuously produced product, e.g. cable, hose, rope, tube, strip, wire, fiber and etc., for pulling a product through a process and for identifying precision lengths for cut-off of the product. This apparatus has first and second shafts which are aligned and spaced apart from each other such that first and second inflatable and pliable members attached to first and second shafts engage each other to define a common chord which engages the product as it moves along the common chord. An encoder responsive to the rotation of the first shaft generates discrete signals which are communicated to a counter to provide an indication of the length and other information with respect to the product. Unfortunately through experience it has been determined that in the manufacture of the first and second inflatable and pliable members significant variations can occur in the actual diameter of such inflatable and pliable members even though they are sold and identified as having the same diameter. This size difference is explained as being a nominal tolerance in the diameter occurring as a result of differences in manufacturing molds for such inflatable and pliable members. Once the length of the common chord is established, this apparatus functions in an acceptable manner as long as the first and second diameters and correspondingly the circumference of the first and second inflatable and pliable members remain substantially identical after calibration of the encoder.

SUMMARY OF THE INVENTION

In the present invention mounting means have been devised for adjusting the space relationship between first and second shafts in a length measuring apparatus to compensate for any differences that may occur in the nominal diameter of first and second inflatable and pliable members attached to the first and second shafts, while maintaining the position of the chord relative to the path of the product. The space relationship of the shafts in the housing of the length measuring apparatus are selected as a function of the diameter of the first and second inflatable and pliable members to establish a desired chord along a fixed plane. The product is aligned along this fixed plane to obtain accurate information such as its length from a starting point to an ending point. After installation and any time thereafter, the fluid pressure in the first and second inflatable and pliable members is maintained by inflator means to assure that once the position of a shaft is fixed in the housing to establish the common chord and the encoder is calibrated as a function the circumference of the inflatable and pliable members, accurate information is obtained even after an extended period of time.

An object of this invention is to establish and maintain a chord length between first and second inflatable and pliable members by selectively adjusting the space relationship between a first shaft and a second shaft with respect to each other and to the plane of the path of the product and as a function of the diameters of the first and second inflatable and pliable members, and to maintain a desired consistent fluid pressure in the inflatable and pliable members.

This object and other advantages should be apparent from reading this specification while viewing the drawings.

BRIEF DESCRIPTION OF THE DRAWINGS

FIG. 2 is a sectional view taken along lines 2—2 of FIG. 6 showing the relation of the first and second shafts in the housing of the length measuring apparatus;

FIG. 3 is a view taken along lines 3—3 of the housing of FIG. 1 showing the space relationship of the mounting holes in the housing for bearings located on the first and second shafts;

FIG. 5 is an enlarged view taken along lines 5—5 of FIG. 2 showing the bearing member attached to the housing;

DETAILED DESCRIPTION OF THE INVENTION

Figure 1:
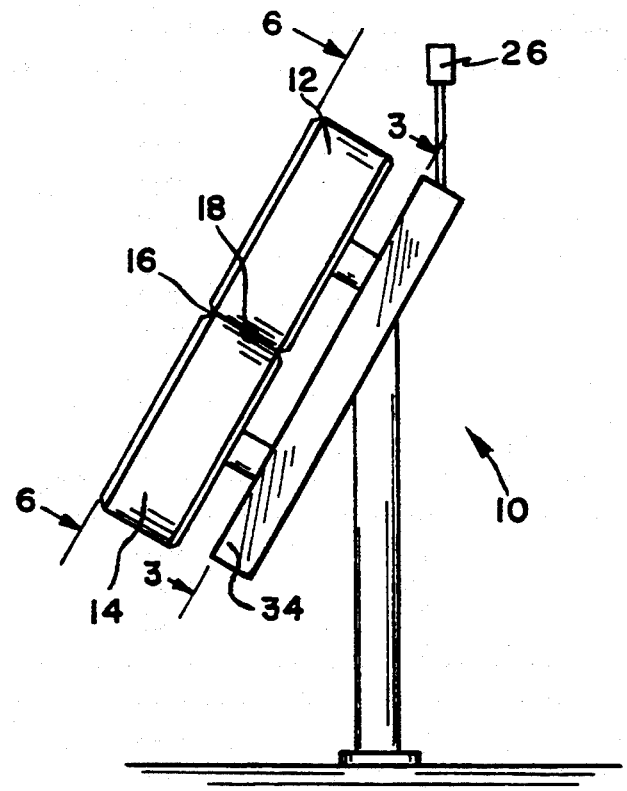
FIG. 1 is a end view of a length measuring apparatus made according to the teaching of the present invention.
Figure 6:
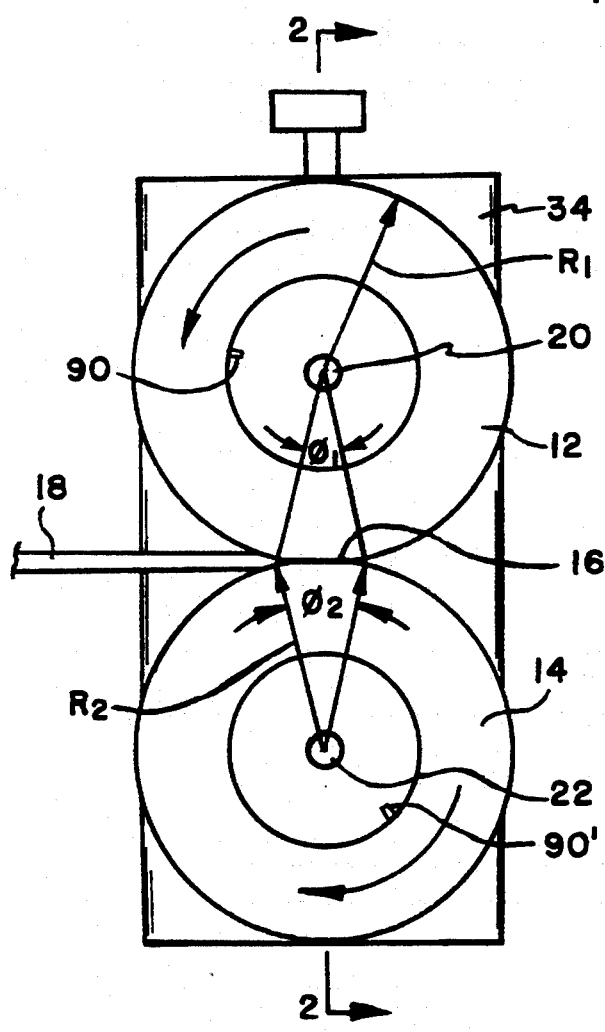
FIG. 6 is a view taken along lines 6—6 of FIG. 1 showing the engagement of first and second inflatable and pliable members to defining a desired chord length along a desired plane.

The length measuring apparatus 10 illustrated in FIG. 1 is substantially of the type disclosed in U.S. Pat. No. 5,065,527 wherein a first inflatable and pliable member 12 engages a second inflatable and pliable member 14. The first inflatable and pliable member 12 is retained on a first shaft 20 and the second inflatable and pliable member 14 is retained on a second shaft 22. The first 20 and second 22 shafts are fixed to side walls 35,35' of housing 34 and spaced from one another to establish a common chord 16 along a fixed plane, see FIGS. 1, 2 and 6. In the length measuring apparatus 10, a continuous product 18 travels along chord 16 and gears 30 and 32 connected to 20 shaft rotate to provide encoder means 24, see FIG. 2, with information relating to product 18 from a starting point to an ending point. Output from the encoder means 24 is communicated to readout 26 to continually provide an operator with visual information with respect to the length of the product 18. In order to obtain accurate information with respect to the product 18, it is essential that the chord 16 of inflatable and pliable members 12 and 14 remain in substantially the same plane after calibration of the encoder means 24. The length of the chord 16 is a function of the radius $R_1$ and $R_2$, the angle of engagement $\phi_1$ and $\phi_2$ and a consistent fluid pressure in the inflatable and pliable members 12 and 14. When radii $R_1$ and $R_2$ are identical shafts 20 and 22 are located an equal distance from chord 16. However, when radii $R_1$ and $R_2$ are different as can occur as a result of manufacturing tolerances, a resulting chord created between such inflatable and pliable members 12 an 14 would not be located on the fixed plane. In order to establish and locate a resulting chord 16 created between non-identical inflatable and pliable members 12 and 14 along the fixed or desired plane and compensate for differences in $R_1$ and $R_2$, an adjustment must be made to either increase or decrease the distance or space relationship between shafts 20 and 22 in housing 34 and the fixed plane created along chord 16. The change in the space relationship is achieved by moving shaft 20 in slots 36, 36' and shaft 22 in slots 37,37' in side walls 35, 35' respectively Bearings 40,40' which are located on each of the shafts 20 and 22 have a flange 44 with openings 52 and 54 therein through which bolts 39 fix shafts 20 and 22 to the side walls 35,35' of housing 34.

Figure 4:
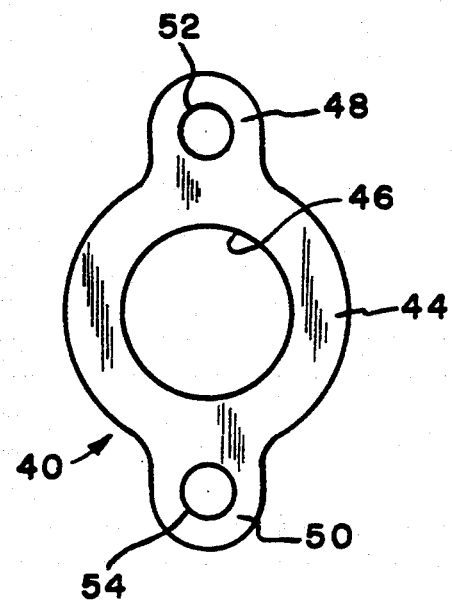
FIG. 4 is an end view of a bearing member for retaining the first and second shafts in the housing of the length measuring apparatus of FIG. 1.

All the bearings 40,40' on shafts 20 and 22 are identical and the details thereof as shown for bearing 40 in FIG. 4. Bearing 40 has a housing 43 with a central opening 46 and ear members 48 and 50 on flange 44. Openings or holes 52 and 54 in the flange 44 of bearings 40,40' are smooth while a plurality of openings 56,56' ... $56^n$,58,58' ... $58^n$,60,60' ... $60^n$ and 62,62' ... $62^n$ in side wall 35,35' are all threaded to receive bolts 39 for securing the bearings 40,40' in side walls 35,35' of housing 34.

As best shown in FIGS. 2, 3 and 4, shafts 20 and 22 are placed in housing 34 and bearings 40 and 40' are thereafter placed on shafts 20 and 22. The diameter of each inflatable and pliable members 12 and 14 are measured to determine $R_1$ and $R_2$ and correspondingly the position of shafts 20 and 22 in housing 34 to define chord 16 having a desired length in a desired plane. The length of chord 16 is a constant and is to be located in a plane while the shafts 20 and 22 are located in a perpendicular plane with respect to chord 16. After $R_1$ and $R_2$ are obtained, the location of each shaft 20 and 22 with respect to the plane of the chord 16 can be determined by the following formula: $y^2 = R_z^2 - -x^2$ where x is one half of the length of the desired chord 16, $R_z$ is the radius of a specific inflatable and pliable member, and y is the distance from the desired plane of chord 16 and the centerline of shafts 20 or 22. To position shafts 20 and 22 in the same perpendicular plane, openings 52 and 54 on the flange 44 of bearings 40 and 40' are moved along a curve or pattern formed by a the plurality of holes openings 56,56' ... $56^n$,58,58' ... $58^n$,60,60' ... $60^n$ and 62,62' ... $62^n$ in side walls 35 and 35'. The various positions of bearing 40' on shaft 20 in side wall 35' is shown in FIG. 5.

Openings 56,56' ... $56^n$ and 60,60' ... $60^n$ are identical and complementary with respect to the plane of chord 16 and located in a first pattern in each side walls 35 and 35'. The x and y coordinates for each hole are sequentially changed while maintaining the center of shafts 20 and 22 in the same perpendicular plane of slots 36, 36' and 37,37'. The length of adjustment provided by slots 36, 36' and 37,37' in the side walls 35, 35' is about 15/16 of an inch and the number of individual holes in the pattern was selected as 15 to provide about 1/16 of an inch incremental change of position of shafts 20 and 22 relative to the desired location of chord 16 between each pair of holes in the pattern while each pair of holes is rotated 15 degrees from the perpendicular plane starting with holes $56^n$ and 60. The change in the x and y coordinates for each successive hole with respect to the previous hole in the first pattern to achieve the desired incremental movement of shafts 20 and 22 with respect to the chord 16 along a perpendicular plane of a slot 36, 36' and 37,37' is determined by the following formula: x equals the sine of the angle of clockwise rotation of a bearing mounting hole from the plane for slots 37,37' (with hole 56 in the 6:00 o'clock equaling zero degrees point being the starting position for the bearing mounting which locates shaft 22) and x equals the sine of the angle of clockwise rotation of the bearing mounting hole from the plane of the slots 36,36' (with hole 58 in the 12:00 o'clock position equaling zero degrees and being the starting position for the bearing mounting which locates shaft 20) multiplied by one half of the distance between holes 52 and 54 and y equals the cosine of the angle of clockwise rotation of the bearing mounting hole from the planes of slots 36,36' and 37,37' multiplied by one half of the distance between the holes 52 and 54 less the increment of change in distance, 1/16 of an inch in the present invention although any increment could be selected, along the perpendicular plane between the first 20 and second shafts 22 with respect to chord 16.

Openings 58,58' ... $58^n$ and 62,62' ... $62^n$ are identical and complementary and located in a second pattern in each side walls 35 and 35'. The x and y coordinates for each bearing mounting hole are sequentially changed while maintaining the center of shafts 20 and 22 in the plane of slots 36, 36' and 37,37'. The length of adjustment provided by slots 36, 36' and 37,37' in the side walls 35, 35' is about 15/16 of an inch and the number of individual bearing mounting holes in the pattern was selected as 15 to provide about 1/16 of an inch incremental change between each individual hole in the pattern while each individual hole is rotated 15 degrees from the plane starting with holes 58 and 62. The change in the x and y coordinates for each successive hole with respect to the previous hole in the second pattern to achieve the desired incremental movement of shafts 20 and 22 with respect to the chord 16 along a perpendicular plane of a slot 36, 36' and 37,37' is determined by the following formula: x equals the sine of the angle of clockwise rotation of a bearing mounting hole from the plane for slots 37,37' (with hole 58 in the 12:00 o'clock position equaling zero degrees and being the starting position for the bearing mounting holes which locate shaft 22) and x equals the sine of the angle of clockwise rotation of the bearing mounting hole from the plane of the slots 36,36' (with hole 62 in the 6:00 o'clock position equaling zero degrees being the starting position for the bearing mounting holes which locate shaft 20) multiplied by one half of the distance between holes 52 and 54 and y equals the cosine of the angle of clockwise rotation of the bearing mounting holes from the plane of slots 36,36' and 37,37' multiplied by one half of the distance between the holes 52 and 54 less the increment of change in distance, 1/16 of an inch in the present invention although any increment could be selected, along the perpendicular plane between the first 20 and second shafts 22 with respect to chord 16.

It should be apparent that the same pattern for the mounting holes is repeated in side walls 35'35' with respect to slots 36,36' and 37,37' in order to position shafts 20 and 22 in the same perpendicular plane while at the same time locating the product in a desired plane of chord 16.

As with the length measuring apparatus disclosed in U.S. Pat. No. 5,065,527, the product 18 moves or is moved along the chord 16 to provide encoder 24 with information relating to a length of a product 18 from a starting first point to an ending second point. During operation of the length measuring apparatus 10, it is desirable to maintain the same fluid pressure in the inflatable and pliable members 12 and 14 to assure that the chord 16 remains in the desired plane over an extended period of time.

Figure 7:
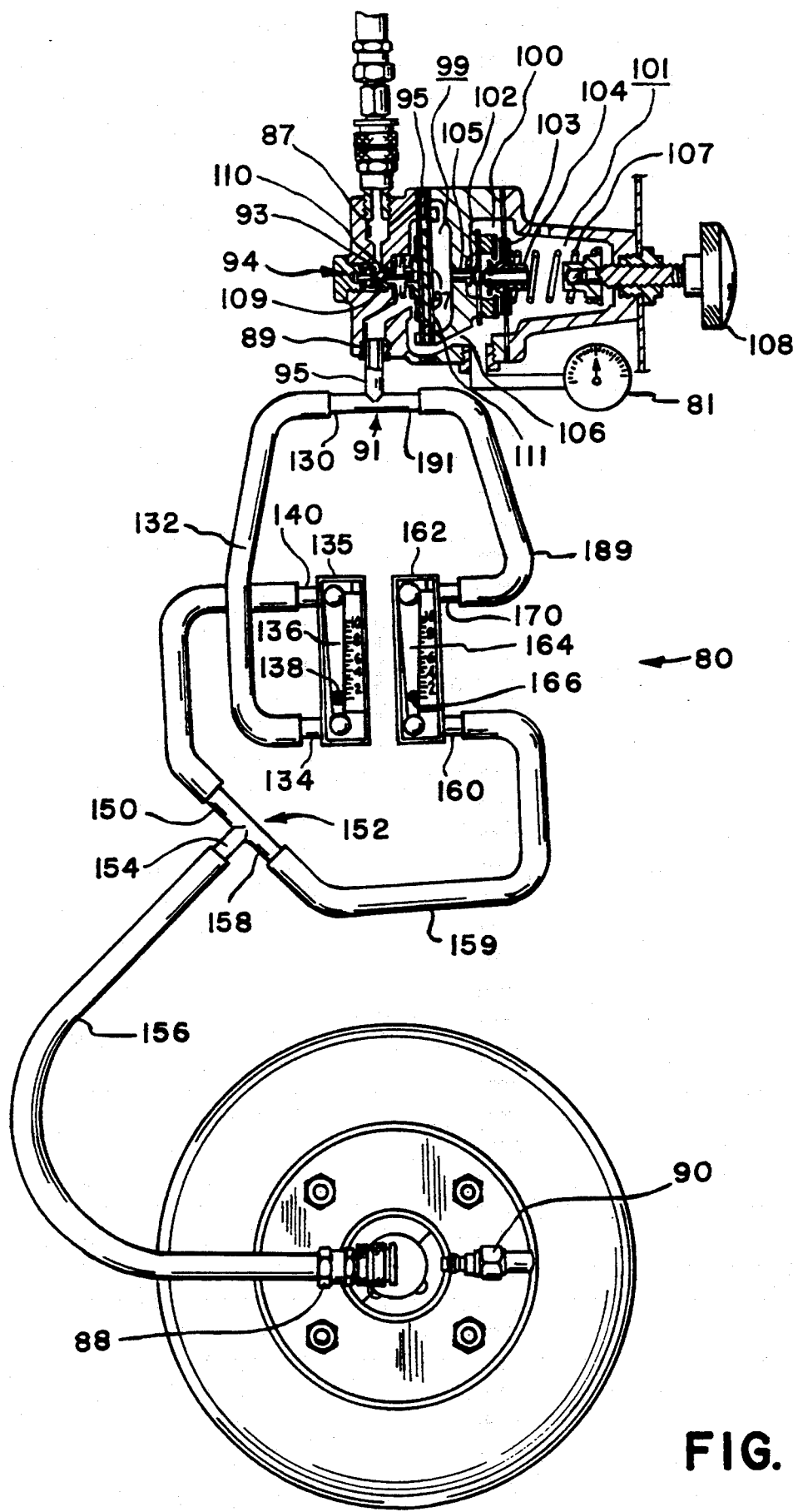
FIG. 7 is schematic illustration of an inflator system for establishing a desired fluid pressure in the first and second inflatable and pliable members to maintain the chord length.

To assure that a desired fluid pressure is provided to the inflatable and pliable members 12 and 14, fluid pressure is provided through an inflater system 80 shown in FIG. 7. The inflater system 80 includes a regulator valve 82, first and second flowmeter 84 and 86 and a quick connect and disconnect connection 88 for providing shop air through valve stem 90, 90' to the inflatable and pliable members 12 and 14.

The regulator valve 82 is a pressure null-balance apparatus which is known in the art and similar to that disclosed in U.S. Pat. No. 2,301,031. Regulator valve 82 has a housing 85 with an inlet port 87 connected to a source of pressurized air and an outlet port 89 connected to a first port 95 of a Y connection 91. Housing 85 has a first chamber 93 with a supply valve 94, a second chamber 188 with a relief valve 96 located therein connected to an exhaust slot 75 through an exhaust port 97 in diaphragm 111, a third chamber 99 connected through on opening 102 to fourth chamber 100 and a fifth chamber 101. A diaphragm 103 which separates chamber 100 from chamber 101 has a stem 104 which forms a nozzle with opening 105 to control the flow of fluid or pressurized air from passage 106 connected to outlet port 89. Spring 107 connected to adjustment knob 108 acts on diaphragm 103 to control the space relationship between stem 104 and the seat 102 surrounding opening 105. Passage 106 communicates the fluid pressure at the outlet port 89 and chamber 100 to a gauge 81 to provide a visual indication of the fluid pressure of the fluid or shop air that is flowing from regulator 82. Chamber 101 is vented to the atmosphere such that fluid pressure supplied to outlet port 89 is essentially a function of spring 107. In operation when knob 108 is turned clockwise, spring 107 moves stem 104 closer to seat 102 to restrict the flow of fluid through opening 105 into chamber 99 and as a result a back pressure on diaphragm 103 increases with an immediate increase in the fluid pressure in chamber 99 which acts on diaphragm 111 and in turn moves to close exhaust port 97 and move ball 109 off of seat 110 to allow fluid to flow from entrance port 87 to exhaust port 89 by way of chamber 188. Flow of fluid will continue until a pressure balance occurs across diaphragms 111 and 103 to match the pressure supplied to the outlet port 89 with that set in gauge 81.

Y connection 91 has a second port 130 connected by conduit 132 to entrance port 134 in housing 135 of flowmeter 84. Entrance port 134 in housing 135 is connected to a internally tapered tube 136 mounted with its large end at the top. A float 138 which is located in the tube 136 has an outer diameter that is slightly less than the minimum diameter of the tube 136 at its entrance. The clearance space between float 138 and the internal surface of tube 136 forms an annular passage or orifice. Tube 136 is tapered and the area of the resulting orifice is larger as the float 138 approaches the top then when float 138 is near the bottom of tube 136. Conduit 132 is connected to the entrance port 134 so that flow is always from bottom toward the top of tube 136. The flow of the pressurized air or fluid moves float 138 upward in tube 136 to a point where it is supported by the fluid flow through a resulting orifice. The exit port 140 in housing 135 of flowmeter 84 is connected to port 150 of a second Y connection 152 by a conduit 151.

Y connection 152 has a port 154 connected by conduit 156 to quick connect and disconnect connection 88 and a port 158 connected to an entrance port 160 of flowmeter 86 by a conduit 159. Connection 88 is designed to mate with stems 90 and 90' in inflatable and pliable members 12 and 14 such that substantially no fluid is lost during separation.

Flowmeter 86 which is identical to flowmeter 84 has a housing 162 with entrance port 160 connected to a internally tapered tube 164 which is mounted with its large end at the top. A float 166 which is located in the tube 164 has an outer diameter that is slightly less than the minimum diameter of the tube 164 at its entrance. The clearance space between float 166 and the internal surface of tube 164 forms an annular passage or orifice. Tube 164 is tapered and the area of the orifice is larger as the float 166 approaches the top then when float 166 is near the bottom of tube 164. Conduit 159 is connected to the entrance port 160 so that flow of pressurized air or fluid is from bottom toward the top of tube 164. The flow of the pressurized air or fluid moves float 166 upward in tube 164 to a point where it is supported by the fluid flow through a resulting orifice. The exit port 170 in housing 162 of flowmeter 86 is connected to port 191 of the first Y connection 91 by conduit 189.

With the first 84 and second 86 flowmeter connected to detect air flow into or out of inflatable and pliable members 12 and 14, an operator has a visual indication that air is flowing in one direction or the other. Both floats 138 and 166 respond to air flow through their respective entrance ports 134 and 166 to indicate that the fluid is flowing into or out of the inflatable and pliable members 12 and 14. When the fluid pressure in an inflatable and pliable member in equilibrium with the desired fluid pressure set in the regulator 82 and shown in gauge 81 no flow occurs through the flowmeter 84 and 86 and floats 138 and 166 are located at the bottom of tubes 136 and 164. In this situation, an operator is visually informed that the fluid pressure in inflatable and pliable member is equal to that set by the gauge 81 in the regulator 82.

A change in the desired fluid pressure in the inflatable and pliable members 12 and 14 may be desired in order to obtain a different grip on the product 18. This change is effected by adjustment of the fluid pressure flowing from the regulator valve 82 and occurs by turning knob 108 to change the force on spring 107. Thus, it is possible to select a desired fluid pressure and this fluid pressure can be repeated to assure that the fluid pressure supplied to inflatable and pliable members through inflator system 80.

I claim:

1. Mounting means for first and second bearings retained on a first shaft, said first and second bearings each having a flange with first and second holes therein, said first shaft being located in first and second slots in a housing to position said first shaft in said housing and establish a desired space relationship with a chord created between first and second inflatable and pliable members along a plane of engagement, said first shaft rotating in response to movement of a product along said chord, said first shaft being connected to an indicator to provide a signal representing a length from a starting point to an ending point on the product, the improvement comprising:
  a first plurality of mounting holes in said housing and located in a first pattern adjacent each of said first and second slots;
  a second plurality of mounting holes in said housing and located in a second pattern adjacent each of said first and second slots; and
  fastener means extending through each of said first and second holes in the flange on the housing of said first and second bearings to positioned said first and second bearings in selected mounting holes of said first and second plurality of mounting holes to fix the position of said first shaft with respect to said chord as a function of the diameter of said first inflatable and pliable member and the length of said chord, said first and second patterns for said first and second plurality of mounting holes being such that the axial center of said first shaft is retained in a same vertical plane through said first and second slots with respect to said chord whenever the position of said first shaft is changed to modify the contact between the first and second inflatable and pliable members, said first and second patterns being such that sequential movement from one hole to the next hole in the first and second patterns simultaneously changes the space relationship between the first shaft and chord through a change in the coordinates of a mounting hole with respect to an immediate previous hole in said first pattern to achieve the desired vertical movement of the first shaft with respect to the chord along said vertical plane of said first and second slots is determined by the following formula: x equals the sine of the angle of clockwise rotation of a starting hole from the vertical plane of a slot, starting at a top hole, multiplied by one half of the distance between the starting first hole and an ending second hole and y equals the cosine of the angle of counter clockwise rotation from the plane of the slot, starting at the top hole, multiplied by one half of the distance between the starting first hole and ending second hole less the increment of change in distance along the same plane between the first shaft and desired plane.

2. The mounting means as recited in claim 1 further including:
  inflator means having a first flowmeter and a second flowmeter, said first flowmeter being connected to a source of fluid pressure through a first y-joint and to a second y-joint connected to distribution nozzle, said second flowmeter being connected to said first and second y-joints, said distribution nozzle being selectively connected to supply a desired fluid pressure to said first and second inflatable and pliable members as a function of a measured radius of said inflatable and pliable members to maintain the length of said chord along a desired plane, said source of fluid flowing from said source through said first flowmeter to said selected first and second inflatable and pliable members while fluid flow may occur from said first and second inflatable and pliable member through said second flowmeter into said first flowmeter until equilibrium is achieved between the fluid pressure obtained from the source and the fluid pressure in the said first and second inflatable and pliable members.

3. The mounting means as recited in claim 1 wherein a change in the coordinates of each mounting hole with respect to the previous hole in the second pattern to achieve the desired movement of the first shaft with respect to the second shaft is determined by the following formula: x equals the sine of the angle of clockwise rotation of the hole from the axial plane of the slot, starting at the bottom hole, multiplied by one half of the distance between the first and second holes and y equals the cosine of the angle of clockwise rotation from the plane of the slot, starting at the bottom hole, multiplied by one half of the distance between the first and second holes plus the increment of change in distance along the plane between the first shaft and chord.

4. The mounting means as recited in claim 1 further including:
  inflater means selectively connectable to said first and second inflatable and pliable members to maintain a fluid pressure therein at a constant value corresponding to a constant circumference for said inflatable and pliable members.

5. The mounting means as recited in claim 4 wherein said inflater means includes:
  regulator means to establish a desired fluid pressure;
  a first y joint having a first port connected to said regulator for receiving said desired fluid pressure, a second port and a third port;
  a first flowmeter connected to receive said desired fluid pressure from said second port of said first y joint to visually indicate fluid flow from said regulator;
  a second y joint having a first port connected to said first flowmeter, a second port connected by a conduit to a connector associated with the selected first or second inflatable and pliable member and a third port;
  a second flowmeter connected to third port of said second y joint and said third port of said first y joint, to visual indicate fluid flow from said selected first or second inflatable and pliable member.

6. The mounting means as recited in claim 5 wherein changes in said desired fluid pressure as presented to said first and second inflatable and pliable members through said conduit can increase and decrease the grip on said product.

7. The mounting means as recited in claim 1 further including:
  a third plurality of mounting holes in said housing and located in a third pattern adjacent third and fourth slots in said housing;
  a fourth plurality of mounting holes in said housing and located in a fourth pattern adjacent said third and fourth slots in said housing;
  third and fourth bearings retained on a second shaft, said second shaft retaining said second inflatable and pliable member, said third and fourth bearings each having a flange with first and second holes therein; and
  fastener means extending through each of said first and second holes in said flange on said third and fourth bearings to position said third and fourth bearings in selected mounting holes of said third and fourth plurality of mounting holes to fix the position of said second shaft with respect to said chord as a function of the diameter of said second inflatable and pliable member and the length of said chord, said third and fourth patterns for said third and fourth plurality of mounting holes being such that the axial center of said second shaft is retained along a perpendicular plane for the first and second slots whenever the position of said second shaft is changed to modify the contact between the first and second inflatable and pliable members.

8. Mounting means for first and second bearings retained on a first shaft, said first and second bearings each having a flanges with first and second holes therein, said first shaft being located in first and second vertical slots in a housing and positioned to define a horizontal chord between first and second inflatable and pliable members along a desired plane, the improvement comprising:

a first plurality of mounting holes in said housing and located in a first pattern adjacent each of said first and second slots;

a second plurality of mounting holes in said housing and located in a second pattern adjacent each of said first and second slots; and fastener means extending through each of said first and second holes in the flange on the housing of said first and second bearings into selected mounting holes of said first and second plurality of mounting holes to fix the position of said first shaft and establish said chord in said desired plane, said first and second patterns for said first and second plurality of mounting holes being such that the axial center of said first shaft is retained in a same plane of said first and second vertical slots and said first shaft with incremental movement of said first shaft toward and away from said desired plane, said first shaft being positionable in said first and second slots through a change in the coordinates of a starting mounting hole with respect to an immediate previous hole in said first pattern to achieve desired vertical movement of the first shaft with respect to the chord along the same vertical plane of said first and second slots is determined by the following formula: x equals the sine of the angle of clockwise rotation of the hole from the plane of a slot, starting at a top hole, multiplied by one half of the distance between the starting first hole and an ending second hole and y equals the cosine of the angle of counter clockwise rotation from the plane of the slot, starting at the top hole, multiplied by one half of the distance between the starting first hole and ending second hole less the increment of change in distance along the same vertical plane between the first shaft and desired plane.

9. The mounting means as recited in claim 8 further including:

inflator means for supplying said first and second inflatable and pliable members with a desired fluid pressure to establish a desired radius to establish said chord;

regulator means to establish a desired fluid pressure;

a first y joint having a first port connected to said regulator for receiving said desired fluid pressure, a second port and a third port;

a first flowmeter connected to receive said desired fluid pressure from said second port of said first y joint to visually indicate fluid flow from said regulator;

a second y joint having a first port connected to said first flowmeter, a second port connected by a conduit to a connector associated with the selected first or second inflatable and pliable member and a third port; and a second flowmeter connected to third port of said second y joint and said third port of said first y joint, to visual indicate fluid flow from said selected first or second inflatable and pliable member.

10. The mounting means as recited in claim 8 wherein a change in the coordinates of each mounting hole with respect to a previous hole in the second pattern to achieve the desired movement of the first shaft with respect to the second shaft is determined by the following formula: x equals the sine of the angle of clockwise rotation of a hole from the axial plane of the slot, starting at the bottom hole, multiplied by one half of the distance between the a first starting hole and second ending hole and y equals the cosine of the angle of clockwise rotation from the plane of the slot, starting at the bottom hole, multiplied by one half of the distance between the first starting hole and second ending hole plus the increment of change in distance along the plane between the first shaft and chord.

* * * * *